(12) United States Patent
David et al.

(10) Patent No.: US 11,109,605 B2
(45) Date of Patent: *Sep. 7, 2021

(54) PROCESS FOR PRODUCING INFANT FORMULA PRODUCTS AND DAIRY PRODUCTS

(71) Applicants: COMPAGNIE GERVAIS DANONE, Paris (FR); N.V. NUTRICIA, Zoetermeer (NL)

(72) Inventors: Franck David, Beaurains (FR); Claire Queguiner, Fontenay-aux-Roses (FR); Laurent Schmitt, Igny (FR); Gerrit Hols, Utrecht (NL); John Tobin, Utrecht (NL); Raoul Charles Johan Moonen, Utrecht (NL)

(73) Assignees: Compagnie Gervals Danone, Paris (FR); N.V. Nutricia, Zoetermeer (NL)

(*) Notice: Subject to any disclaimer, the term of this patent is extended or adjusted under 35 U.S.C. 154(b) by 132 days.

This patent is subject to a terminal disclaimer.

(21) Appl. No.: 16/324,074

(22) PCT Filed: Aug. 8, 2017

(86) PCT No.: PCT/EP2017/070116
§ 371 (c)(1),
(2) Date: Feb. 7, 2019

(87) PCT Pub. No.: WO2018/029216
PCT Pub. Date: Feb. 15, 2018

(65) Prior Publication Data
US 2019/0166864 A1    Jun. 6, 2019

(30) Foreign Application Priority Data

Aug. 8, 2016 (WO) ................. PCT/EP2016/068911

(51) Int. Cl.
| | |
|---|---|
| A23C 9/20 | (2006.01) |
| A23L 33/00 | (2016.01) |
| A23C 9/13 | (2006.01) |
| A23C 9/142 | (2006.01) |
| A23C 9/15 | (2006.01) |
| A23C 19/05 | (2006.01) |

(52) U.S. Cl.
CPC ............... *A23C 9/20* (2013.01); *A23C 9/13* (2013.01); *A23C 9/1307* (2013.01); *A23C 9/1422* (2013.01); *A23C 9/1427* (2013.01); *A23C 9/1512* (2013.01); *A23C 19/05* (2013.01); *A23C 19/053* (2013.01); *A23L 33/40* (2016.08); *A23C 2210/202* (2013.01); *A23C 2210/206* (2013.01); *A23C 2210/252* (2013.01); *A23C 2260/05* (2013.01); *A23V 2002/00* (2013.01)

(58) Field of Classification Search
CPC ........... A23C 9/20; A23C 9/13; A23C 9/1307; A23C 9/1422; A23C 9/1427; A23C 9/1512; A23C 19/05; A23C 19/053; A23C 2210/202; A23C 2210/206; A23C 2210/252; A23C 2260/05; A23L 33/40; A23V 2002/00
USPC ....... 426/580, 583, 585, 478, 490, 491, 800, 426/801
See application file for complete search history.

(56) References Cited

U.S. PATENT DOCUMENTS

| | | | |
|---|---|---|---|
| 5,503,865 | A | 4/1996 | Behringer et al. |
| 10,674,739 | B2* | 6/2020 | Tobin ................. A23J 1/20 |
| 2014/0302219 | A1* | 10/2014 | Tikanmaki .......... A23C 9/1422 |
| | | | 426/580 |
| 2014/0308398 | A1 | 10/2014 | Merrill |
| 2015/0320061 | A1 | 11/2015 | Warin et al. |
| 2016/0205960 | A1* | 7/2016 | Tobin ................. A23C 9/1425 |
| 2018/0027864 | A1* | 2/2018 | Kallioinen ............ A23L 33/40 |

FOREIGN PATENT DOCUMENTS

| | | |
|---|---|---|
| WO | WO 2000/030461 A1 | 6/2000 |
| WO | WO 2011/051557 A1 | 5/2011 |
| WO | WO 2013/068653 A2 | 5/2013 |
| WO | WO 2013/137714 A1 | 9/2013 |
| WO | WO 2014/068187 A1 | 5/2014 |
| WO | WO 2014/163493 A1 | 10/2014 |
| WO | WO 2014/163494 A1 | 10/2014 |
| WO | WO 2015/041529 A2 | 3/2015 |

OTHER PUBLICATIONS

International Search Report issued in PCT/EP2017/070116, dated Sep. 12, 2017.

(Continued)

*Primary Examiner* — Leslie A Wong
(74) *Attorney, Agent, or Firm* — N.V. Nederlandsch Octrooibureau; Catherine A. Shultz (57) ABSTRACT

The invention pertains to a process for simultaneous producing an infant formula product and a dairy product from defatted animal milk, comprising (a) processing the milk into a casein stream, a whey protein stream and a lactose stream by a combination of microfiltration and ultrafiltration, wherein the casein stream originates from the microfiltration as retentate, the whey protein stream originates from the ultrafiltration as retentate and the lactose stream originates from the ultrafiltration as permeate; (b) combining at least part of the whey protein stream originating from step (a) and a lactose source to obtain are combined stream; (c) using the recombined stream originating from step (b) in the manufacture of the infant formula product; and (d) using at least part of the casein stream originating from step (a) and defatted animal milk in the manufacture of the dairy product. The invention further concerns the infant formula product obtainable by step (c) of the process according to the invention, and to the dairy product obtainable by step (d) of the process according to the invention.

13 Claims, 1 Drawing Sheet

(56) References Cited

OTHER PUBLICATIONS

Written Opinion of the International Searching Authority issued in PCT/EP2017/070123, dated Sep. 12, 2017.

* cited by examiner

PROCESS FOR PRODUCING INFANT FORMULA PRODUCTS AND DAIRY PRODUCTS

CROSS-REFERENCE TO RELATED APPLICATIONS

This application is the National Phase of International Patent Application No. PCT/EP2017/070116, filed Aug. 8, 2017, published on Feb. 15, 2018 as WO/2018/029216 A1, which claims priority to International Patent Application No. PCT/EP2016/068911, filed Aug. 8, 2016. The contents of these applications are herein incorporated by reference in their entirety.

The invention is in the field of milk treatment, in particular the treatment of defatted animal milk. The invention relates to the production of infant formula products, such as infant formula bases, as well as dairy products, from the same starting material. The invention further concerns the infant formula product and the dairy product obtainable by the process according to the invention.

BACKGROUND

Human milk is considered the 'golden standard' for infant nutrition. Processing animal milk, for example cow's milk, to more resemble the composition of human milk is known in the art as 'humanizing' animal milk. The process of humanizing animal milk involves changing the ratio of casein:whey proteins as found in animal milk (e.g. approximately 80:20 for cow's milk) to the desired ratio for infant nutrition as found in human milk, for example between 75:25 and 30:70, or usually approximately 40:60, which is the ratio found in human milk in months 0-6 post-partem. In addition, the mineral content of animal milk is typically higher than the content found in human milk. Thus humanization of animal milk also involves reducing of the mineral content.

Preparation of products suitable for use in infant nutrition typically involves blending of various individually purified components in the appropriate ratios, either wet or dry. Current manufacturing processes require multiple dairy ingredients from intermediate suppliers, including skim milk or a concentrate thereof, including skim milk powder, demineralised whey or a concentrate thereof, including demineralised whey powder, whey protein concentrates or isolates, normally as powders, and pure grade lactose, typically in powder form, to formulate a nutritionally balanced infant formula.

Membrane filtration processes for the manufacture of infant formula products from milk are known from e.g. WO 2013/137714, WO 2015/041529, U.S. Pat. No. 5,503,865, EP 1133238, WO 2013/068653, WO 2014/163493 and WO 2014/163494. None disclose an efficient and cost-effective way to reduce waste streams, in particular the excess casein that typically remains when infant formula products are produced from milk. WO 2015/041529 employs this excess casein to produce a nutritional product suitable for feeding infants from 6-36 months of age.

There remains a need in the art for a process that enables efficient and cost-effective preparation of infant formula products from milk, which further reduces the number of waste streams.

SUMMARY OF THE INVENTION

The invention pertains to a process for simultaneous producing an infant formula product and a dairy product from defatted animal milk. The invention further concerns the infant formula product obtainable by the process according to the invention, and to the dairy product obtainable by the process according to the invention. The process according to the invention comprises:
(a) processing the milk into a casein stream, a whey protein stream and a lactose stream by a combination of microfiltration and ultrafiltration, wherein the casein stream originates from the microfiltration as retentate, the whey protein stream originates from the ultrafiltration as retentate and the lactose stream originates from the ultrafiltration as permeate;
(b) combining at least part of the whey protein stream originating from step (a) and a lactose source to obtain a recombined stream;
(c) using the recombined stream originating from step (b) in the manufacture of the infant formula product; and
(d) using part of the casein stream originating from step (a) and defatted animal milk in the manufacture of the dairy product.

The process according to the invention elegantly makes use of all components of the incoming defatted animal milk and minimizes the amount of waste streams that are obtained. According to a preferred embodiment, the process enables the formation of both an infant formula product and a dairy product from the incoming defatted animal milk as single protein source. A further advantage of the process according to the invention is that both products are efficiently and cost-effectively produced, with minimal supplementation requirements.

List of Preferred Embodiments

1. Process for producing an infant formula product and a dairy product from defatted animal milk, comprising:
    (a) processing the milk into a casein stream, a whey protein stream and a lactose stream by a combination of microfiltration and ultrafiltration, wherein the casein stream originates from the microfiltration as retentate, the whey protein stream originates from the ultrafiltration as retentate and the lactose stream originates from the ultrafiltration as permeate;
    (b) combining at least part of the whey protein stream originating from step (a) and a lactose source to obtain a recombined stream;
    (c) using the recombined stream originating from step (b) in the manufacture of the infant formula product; and
    (d) using at least part of the casein stream originating from step (a) and defatted animal milk in the manufacture of the dairy product.
2. Process according to embodiment 1, wherein the lactose source comprises acid whey.
3. Process according to embodiment 2, wherein the acid whey that is used in the combining of step (b) is obtained as by-product during the manufacture of step (d).
4. Process according to embodiment 3, wherein the acid whey is obtained as a liquid stream from a separation step during the manufacture of step (d).
5. Process according to any one of embodiments 2-4, wherein the acid whey is subjected to demineralization prior to being used as lactose source in step (b), preferably wherein demineralization comprises at least one of salt precipitation, electrodialysis, lactose crystallization and ion exchange, optionally in combination with nanofiltration.
6. Process according to any one of the preceding embodiments, wherein at least part of the lactose stream originating from step (a) is used as lactose source in step (b) and/or is used in the manufacture of step (d).

7. Process according to embodiments 2 and 6, wherein the acid whey and at least part of the lactose stream originating from step (a) are combined and subsequently subjected to the demineralization according to embodiment 5 prior to being used as lactose source in step (b).

8. Process according to embodiment 6 or 7, wherein part, preferably 50-95 wt % based on total weight of the lactose, of the lactose stream is used as lactose source in step (b) and part of the lactose stream, preferably the remaining part, is used in the manufacture step (d).

9. Process according to any one of the preceding embodiments, wherein substantially all of the casein stream originating from step (a) is used in the manufacture of step (d).

10. Process according to any one of the embodiments 1-8, wherein part of the casein stream originating from step (a) is used in the manufacture of step (d) and part of the casein stream, preferably the remaining part, is subjected to the combining of step (b) and included in the recombined stream.

11. Process according to any one of the preceding embodiments, wherein step (d) involves combining the casein stream originating from step (a) with defatted animal milk, preferably wherein the weight ratio of protein from the casein stream to protein from the defatted animal milk is in the range of 0.1-9.0, most preferably in the range 0.5-2.0.

12. Process according to any one of the preceding embodiments, wherein the defatted animal milk used in steps (a) and/or (d), preferably in steps (a) and (d), is skim milk, preferably pasteurized skim milk.

13. Process according to any one of the preceding embodiments, wherein the process further comprises:
   (i) subjecting the defatted milk to bacterial removal, preferably by heat treatment or filtration, most preferably by pasteurization, to provide a debacterialized defatted milk which is subjected to step (a).

14. Process according to any one of the preceding embodiments, wherein the processing of step (a) comprises:
   (ii) subjecting the milk to microfiltration (MF) to obtain an MF-Retentate (MFR) and an MF-Permeate (MFP), and
   (iii) subjecting the MFP originating form step (ii) to ultrafiltration (UF) to obtain an UF-Retentate (UFR) and an UF-Permeate (UFP).

15. Process according to any one of the preceding embodiments, wherein the volume concentration factor at which the ultrafiltration step operates is in the range of 20-200.

16. Process according to any one of the preceding embodiments, wherein the manufacturing of step (c) includes at least one of drying, concentrating, supplementing with vitamins, minerals, lipids and/or dietary fibres, packaging.

17. Process according to any one of the preceding embodiments, wherein the dairy product is selected from the group consisting of cheeses, yogurts and creams, preferably the dairy product is an acidic dairy product selected from the group consisting of fermented dairy products and acid cheeses, most preferably the dairy product is a strained yogurt.

18. Process according to any one of the preceding embodiments, wherein defatted animal milk is the sole protein source for the infant formula product, preferably for both the infant formula product and the dairy product.

19. Infant formula product obtainable by step (c) of the process according to any one of embodiments 1-18.

20. Dairy product obtainable by step (d) of the process according to any one of embodiments 1-18.

DETAILED DESCRIPTION

In the process according to the invention defatted animal milk is treated to produce an infant formula product and a dairy product. In the process, steps (a)-(c) concern the production of the infant formula product and steps (a) and (d) the production of the dairy product. The present invention combines a dairy product production process and an infant formula product production process in order to minimize the waste streams and at the same time efficiently and cost-effectively produce both products with the need of minimal supplementation. The inventors surprisingly found that the components that are conventionally discarded as waste for one product form ideal components to be used in the production of the other product, such that waste streams are minimized and the need for supplementation of further components minimized. In other words, the casein that remains when producing an infant formula product from milk is ideally suited to be used in the production of acid dairy products, and, according to a preferred embodiment, the acid whey that remains when producing a dairy product from casein according to the present invention is ideally suited to be used in the production of an infant formula product.

The inventive merit of the present invention resides not only in the finding that left-over casein of infant formula product manufacture from milk is ideally suited to produce acid dairy products, but also in the finding that the acid whey co-product of the latter process can efficiently be used in the manufacture of an infant formula product from milk. Compared to the individual processes, the combined process for making an infant formula product as well as a dairy product according to the present invention reduces the need for addition of external ingredients, especially in the production of infant formula products and at the same time utilizes substantially all of the components of the incoming defatted milk in valuable products. As such, the production of waste, which is currently cost-neutrally disposed of, is largely avoided.

In a first aspect, the invention pertains to a process for producing an infant formula product and a dairy product from defatted animal milk, comprising:
(a) processing the milk into a casein stream, a whey protein stream and a lactose stream by a combination of microfiltration and ultrafiltration, wherein the casein stream originates from the microfiltration as retentate, the whey protein stream originates from the ultrafiltration as retentate and the lactose stream originates from the ultrafiltration as permeate;
(b) combining at least part of the whey protein stream originating from step (a) and a lactose source to obtain a recombined stream;
(c) using the recombined stream originating from step (b) in the manufacture of the infant formula product; and
(d) using part of the casein stream originating from step (a) and defatted animal milk in the manufacture of the dairy product.

This process, including preferred embodiments thereof which are further defined below, is also referred to as the process according to the invention.

In a further aspect, the invention pertains to the infant formula product obtainable by step (c) of the process according to the invention. In one embodiment, this aspect of the invention pertains to the infant formula product obtained by step (c) of the process according to the invention.

In a further aspect, the invention pertains to the dairy product obtainable by step (d) of the process according to the invention. In one embodiment, this aspect of the invention pertains to the dairy product obtained by step (d) of the process according to the invention.

Herein, it is preferred that the lactose source comprises or originates from acid whey, more preferably acid whey obtained as by-product during the manufacture of step (d). As such, acid whey is recycled from the dairy product production to the infant formula product production, making particular efficient use of streams that conventionally are waste streams. In a preferred embodiment, the lactose source is acid whey which is substantially devoid of minerals and proteins. The acid whey is preferably subjected to demineralization and/or protein removal steps to yield said acid whey substantially devoid of minerals and proteins.

Herein, it is preferred that at least part of, preferably all of the lactose stream originating from step (a) is used as (part of) the lactose source in step (b) and/or is used in the manufacture of step (d). In one embodiment, the lactose source comprises at least part of the lactose stream originating from step (a) and acid whey, preferably acid whey obtained as by-product during the manufacture of step (d).

Herein, it is preferred that all of the casein stream originating from step (a) is used in steps (b) and (d). In one embodiment, substantially all of the casein stream originating from step (a) is used in the manufacture of step (d). In one embodiment, part of the casein stream originating from step (a) is used in the manufacture of step (d) and part of the casein stream, preferably the remaining part, is subjected to the combining of step (b) and included in the recombined stream.

Herein, it is preferred that all of the whey protein stream originating from step (a) is used in step (b).

In the context of the present invention, whenever a certain stream or composition is mentioned to "originate from" a certain process step, such as from the recombined stream originating from step (b), said stream or composition can be the composition which is directly obtained by said process step. In addition, if such a directly obtained stream or composition undergoes one or more additional processing steps, such as partial evaporation and/or supplementation of additional water or other components, the stream or composition is also regarded to originate from that specific process step. Thus, if the recombined stream of step (b) would be partially evaporated prior to it is entered in the infant formula product manufacture of step (c), the incoming stream of step (c) is still regarded to be the recombined stream originating from step (b).

In one embodiment, the casein stream obtained in step (a) is used directly in step (d), without substantial alteration thereof. In one embodiment, the whey protein stream obtained in step (a) is used directly in step (b), without substantial alteration thereof.

In the context of the present invention, the term "stream" refers to a liquid composition, although the presence of some solid material is not excluded, e.g. as in a suspension, as long as the composition can be handled by conventional dairy plants.

The process according to the invention produces two distinct products: an infant formula product and a dairy product, both of which are obtained from defatted milk. In the context of the present invention, "infant formula product" refers to milk-based nutritional compositions suitable for feeding infants, which typically are in the form of a reconstitutable powder or a ready-to-feed liquid composition, or refers to infant formula bases, which are suitable for making infant formulae and which comprise all or almost all essential ingredients in the required amounts for infant nutrition. Preferably, the present process is for preparing infant formulae, follow-on formulae growing-up milks, or bases therefore. In the context of the present invention, the infant formula product is distinct from the dairy product. In one embodiment, the process according to the invention is for producing an infant formula product and a further dairy product.

The dairy product is preferably selected from the group consisting of cheeses, yogurts and creams. In other words, the dairy product is a product that may or may not give rise to the provision of a whey by-product during the manufacture thereof. In the broadest sense of this disclosure, the dairy product thus includes fresh cheeses such as quark, fermented dairy products such as a yoghurt (stirred or set yoghurts), strained fermented dairy products such as a strained yoghurt (also called concentrated yoghurt or Greek-style yoghurt).

In one embodiment, the dairy product is not a growing-up milk (GUM) for infants from 6-36 months of age. In one embodiment, the dairy product is not a nutritionally product specifically designed for infants from 0-36 months of age.

Preferably, the dairy product is an acidic dairy product. In the context of the present invention, "acidic dairy product" refers to fermented dairy products (e.g. yogurts) and acid cheeses, during the production of which acid whey is formed as by-product, such as cottage cheeses, strained yogurts or Greek-style yogurts. Acid dairy products, during the production of which acid whey is formed as by-product, are particularly preferred as the acid whey is advantageously used as lactose source in step (b) of the process according to the invention.

In a preferred embodiment, the acid dairy product is a strained fermented dairy product. Processes for the production of strained fermented dairy products are known in the art for example in WO 2014/114970 or WO 2014/169171. Herein, "acid cheese" refers to acid type of cheeses or "acid-coagulated cheeses", such as cottage cheese or similar types of cheeses. As known in the art, acid cheeses are those cheeses that give acid whey as by-product during their production. In other words, acids are used to form coagulates in the production of acid cheeses. Such processes to produce acid cheeses are well-known in the art. In one embodiment, the acid cheese is selected from cottage cheese and quark. Preferably, the acid dairy product as referred to herein is a fermented dairy product or acid cheese product that includes in its production process a step wherein whey is separated from the curd. Such separation may comprise centrifugation, filtration and/or straining.

The present process uses milk as starting material in step (a) and (d). Defatted animal milk is subjected to step (a) and is used in combination with at least part of the casein stream in the manufacture of step (d). In the context of the invention, "defatted milk" refers to milk having a reduced fat content compared to whole milk. Typically the fat content of the defatted milk is in the range of 0-2 wt %, preferably 0-1 wt %, more preferably 0-0.2 wt %, most preferably 0-0.05 wt %, based on total weight of the defatted milk. In one embodiment, the defatted milk is skim milk. The present process employs animal milk, which refers to non-human milk, preferably cow's milk. Most preferably, cow's skim milk is used. In one embodiment, the process comprises a step of defatting milk to obtain the defatted animal milk, which is subsequently subjected to step (a). Herein, nondefatted animal milk, or just animal milk or whole animal milk, is subjected to the defatting step. The defatting step affords the defatted animal milk.

The incoming milk, prior to after being defatted, typically after a defatting step, may be subjected to debacterization (bacterial removal). e.g. by UV treatment, heat treatment (e.g. microwave heating, pasteurization, such as HTST, ESL or UHT, or sterilization, for example dry heat or moist heat sterilization) or by bacterial filtration (e.g. microfiltration). In the context of the present invention, debacterization is referred to as step (i). Such processes to reduce the bacterial load of milk are known in the art. In one preferred embodiment, the incoming milk is subjected to pasteurization.

Thus, in one embodiment, the defatted animal milk used in steps (a) and/or (d), preferably in steps (a) and (d), is skim milk, preferably pasteurized skim milk.

Step (a)

In step (a), the defatted animal milk is processed or fractioned into a casein stream, a whey protein stream and a lactose stream. Herein, the casein stream is a liquid composition comprising casein, which is enriched in casein compared to the casein content in the incoming defatted animal milk, the whey protein stream is a liquid composition comprising whey protein, which is enriched in whey protein compared to the whey protein content in the incoming defatted animal milk and the lactose stream is a liquid composition comprising lactose, which is enriched in lactose compared to the lactose content in the incoming defatted animal milk. In the context of the present invention, "enriched" is defined that the content of the enriched component, based on dry weight, is increased in one stream compared to another stream. Thus, the casein stream is enriched in casein, i.e. has a higher casein content, based on dry matter, compared to the incoming defatted animal milk.

The protein fraction of the casein stream originating from step (a) typically comprises very little whey protein, preferably less than 15 wt %, more preferably less than 10 wt %, based on the weight of the protein fraction of the casein stream, and is high in casein. Preferably the protein fraction comprises at least 85 wt % casein, more preferably the protein fraction comprises at least 90 wt % casein. The content of total solids in the casein stream typically ranges from 5 to 30 wt %, preferably ranges from 7 to 30 wt %, most preferably from 17 to 24 wt %, based on total weight of the casein stream. The casein stream is preferable a microfiltration retentate (MFR). The casein stream may also be referred to as a casein concentrate, casein isolate, micellar casein concentrate or micellar casein isolate (MCI).

The whey protein stream is typically a liquid composition having a total solid content of 5-35 wt %, preferably of 10-30 wt %, most preferably of 20-30 wt %, and typically comprises 25-90 wt %, preferably 60-85 wt % whey proteins based on total dry weight. The whey protein stream is preferable an ultrafiltration retentate (UFR). The whey protein stream may also be referred to as an aqueous composition comprising whey proteins.

Although the whey protein stream is enriched in whey protein compared to the incoming defatted milk, it may still contain substantial amounts of casein, depending on the exact conditions at which the fractionation between casein and whey protein, typically by ultrafiltration, is performed. In one embodiment, the whey protein stream comprises at most 40 wt %, preferably 5-20 wt % casein, based on total weight of the protein. Such variations in the fractionation conditions and the accompanying changes in the whey protein stream are known in the art. Depending on the amount of casein present in the whey protein stream, the amount of casein used in combining step (b) can be adapted such that the infant formula product has a whey protein:casein ratio that falls within the preferred ratio of 90:10 to 40:60.

The lactose stream is typically a liquid composition having a total solid content of 3-30 wt %, preferably of 5-22 wt %. The lactose content in the lactose stream originating from step (a) is typically at least 75 wt %, preferably at least 90 wt % or even at least 95 wt %, based on total dry weight.

The fractionation of step (a) is accomplished by membrane filtration techniques and involves a combination of microfiltration and ultrafiltration. The casein stream originates from the microfiltration as retentate, the whey protein stream originates from the ultrafiltration as retentate and the lactose stream originates from the ultrafiltration as permeate. Suitable membrane filtration processes are known in the art, e.g. as disclosed in WO 2013/068653, WO 2013/137714 and WO 2015/041529.

In one embodiment, step (a) comprises:
(ii) subjecting the milk to microfiltration (MF) to obtain an MF retentate (MFR) and an MF permeate (MFP), and
(iii) subjecting the MFP originating form step (ii) to ultrafiltration (UF) to obtain an UF retentate (UFR) and an UF permeate (UFP).

In the microfiltration step (ii), defatted animal milk is fractioned into two distinct streams, each enriched in a particular protein type; a casein enriched MF retentate (MFR) and a whey protein enriched MF permeate (MFP) are produced. The MF step (ii) is performed over a membrane that enables fractionation of casein and whey proteins. Such a membrane typically has a porosity of 0.05-0.35 micrometer. Preferably, a ceramic membrane or a spiral wound (organic) membrane is used.

According to a preferred embodiment, microfiltration of step (ii) is enhanced with diafiltration (DF). Diafiltration may be accomplished by diluting the retentate of the MF at least once with an amount of water, or by diluting the incoming animal skim milk with an amount of water and subjecting the diluted animal skim milk to MF. The DF water may be added to the incoming animal skim milk or MFR at once, or the total amount of DF water may be added in several fractions. After each addition of DF water to the incoming animal skim milk or MFR, the diluted liquid composition is subjected to MF.

During ultrafiltration step (iii) most of the liquid and small solutes end up in the UF permeate (UFP), while the UF retentate (UFR) comprises substantially all whey protein, in a smaller volume. Small molecules which permeate through the UF membrane are for example lactose, monovalent and polyvalent ions. The ultrafiltration of step (iii) can be carried out with any UF membrane known in the art, including ceramic membranes, tubular and organic spiral wound membranes. Preferably the UF membrane is an organic spiral wound membrane. The UF membrane has a molecular weight cut-off of that enables proteins, preferably whey proteins, to remain in the retentate, and allow small solutes, for example lactose, to permeate through the membrane. The UF step (iii) preferably is carried out with a membrane having a molecular weight cut-off of at most 25 kDa, more preferably at most 10 kDa, and preferably of at least 2.5 kDa, more preferably at least 5 kDa. The UF step (iii) is preferably carried out with a volume concentration factor (VCF) in the range of 20-200, preferably 50-150, which has been found to provide the most optimal results in terms of the composition of the UF retentate.

In the context of the invention, the term "volume concentration factor" or "VCF" is the factor at which a liquid composition is concentrated upon filtration, i.e. the total volume of the incoming stream prior to filtration divided by the total volume of the retentate after filtration, irrespective of the total solid content. Thus, when 5 L of a liquid composition is fractionated over an ultrafiltration membrane into a permeate of 4 L and a retentate of 1 L, this UF process operates with a VCF of 5/1=5.

Step (a) may further comprise one or more concentration steps, such as concentration of the MFR originating form step (ii) and/or the UFR originating form step (iii). Concentration is preferably performed by reverse osmosis (RO), nanofiltration (NF) and/or evaporation. NF is most preferred, as NF concentrates the stream and at the same time lowers the monovalent ion content, which are able to permeate the NF membrane. Such lowering of the monovalent ion content is typically desirable in the production of infant formula products.

Demineralization

The process according to the invention preferably comprises a demineralization step, wherein the lactose source, or one or more components thereof, is/are demineralized prior to being subjected to step (b). Demineralization is thus typically performed on at least part of the lactose stream originating from step (a) and/or on the acid whey originating from step (d), preferably at least the acid whey originating from step (d) is subjected to demineralization prior to being subjected to step (b). Demineralization is particularly preferred for the manufacture of infant formula products, for which it is typically required to lower the mineral content as compared to the incoming milk.

Thus, in one embodiment, the acid whey, preferably the acid whey originating from step (d), is subjected to demineralization prior to being used as (part of) the lactose source in step (b). Likewise, in one embodiment, at least part of the lactose stream originating from step (a), preferably the UFP originating from step (iii), is subjected to demineralization prior to being used as (part of) the lactose source in step (b).

In case the lactose stream originating from step (a) is not subjected to step (b) but for example to step (d), demineralization of the lactose stream is typically not required, as the desired mineral content of dairy products typically more or less corresponds to the mineral content of the incoming milk. In case part of the lactose stream originating from step (a) is subjected to step (b) and part is subjected to step (d), it is preferred that only that part that is subjected to step (b) is first subjected to demineralization. In a preferred embodiment, acid whey that originates from step (d) is subjected to step (b) as (part of) the lactose source, and subsequently to the manufacture of the infant formula product of step (c). It is thus preferred that the acid whey is demineralized prior to step (b). Hence, in a preferred embodiment, the acid whey originating from step (d) is combined with the part of the lactose stream originating from step (a), if any, and the combined lactose source is subjected to demineralization prior to subjecting them to step (b).

Demineralization of the lactose source may be performed by any technique known in the art, such as electrodialysis, ion exchange, salt precipitation, lactose crystallization, membrane filtration techniques such as nanofiltration, optionally enhanced with diafiltration, or combinations thereof. In a preferred embodiment, demineralization comprises at least one of salt precipitation, electrodialysis, lactose crystallization and ion exchange, optionally in combination with nanofiltration, more preferably demineralization comprises nanofiltration in combination with at least one of salt precipitation, electrodialysis, lactose crystallization and ion exchange. In preferred embodiment, demineralization comprises at least electrodialysis and/or salt precipitation. In one preferred embodiment, demineralization comprises at least nanofiltration in combination with electrodialysis and/or salt precipitation. The inventors found that when only nanofiltration is used for demineralization, especially for demineralization of an ultrafiltration permeate as lactose source in the preparation of infant formula products, the content of divalent ions, such as calcium and phosphate, is typically insufficiently reduced to obtain a final infant formula product within legal requirement.

Demineralization is preferably performed such that at least 20 wt %, or preferably 50 wt %, more preferably at least 70 wt % or at least 80 wt %, most preferably at least 90 wt % of the polyvalent ions and/or such that at least 20 wt % of the monovalent ions are removed, more preferably at least 35 wt % or at least 50 wt %, most preferably at least 60 wt % of the monovalent ions, present in the lactose stream, e.g. the UFP originating from step (iii), are removed.

Step (b)

In step (b), at least part of the whey protein stream originating from step (a) is combined with a lactose source to obtain a recombined stream. This recombined stream is used to manufacture the infant formula product in step (c). The combining of step (b) affords a composition having a protein fraction comprising both casein and whey protein in a certain weight ratio. The combining of step (b) may involve additional components, such as part of the casein stream originating from step (a). As the whey protein stream may contain substantial amounts of casein, combining with part of the casein stream originating from step (a) is not always required. In that case, all of the casein stream is preferably used in step (d), in order to minimize waste streams.

The combining is preferably done such that the whey protein to casein weight ratio in the recombined stream is in the range of 90:10 to 40:60, more preferably in the range of 80:20 to 50:50, even more preferably in the range of 75:25 to 50:50, most preferably in the range of 70:30 to 55:45. In one embodiment, the whey protein to casein weight ratio in the recombined stream is about 60:40. The exact ratio is typically determined by the type of infant formula product that is being produced, and can be adjusted as known in the art. In addition, much attention in the art is given to the amino acid profile of infant formula products. The process according to the invention provides optimal flexibility in targeting a specific desired amino acid profile, e.g. by adjusting the ratio in which the whey protein and casein streams are combined or in varying the specific process conditions of the microfiltration of step (a). As such, optimal amino acid profiles resembling those found in human milk are obtainable with the process according to the invention.

As infant formula products typically require the presence of less casein and more whey protein as present in the defatted animal milk which is subjected to step (a), not all of the casein stream is needed in order to recombine with the whey protein stream. The present invention puts this remaining casein, which is presently mostly discarded, to good use, in the manufacture of step (d).

Typically, all of the casein stream originating from step (a) is used in either step (b) or in step (d), such that no further casein is remaining or left-over. In other words, the casein stream originating from step (a) is preferably divided over steps (b) and (d). It is thus preferred that part of the casein stream originating from step (a) is used in the manufacture of step (d) and part of the casein stream, preferably the remaining part, is subjected to the combining of step (b) and included in the recombined stream. In an alternative embodiment, substantially all of the casein stream originating from step (a) is used in the manufacture of step (d).

In one embodiment, 10-50 wt %, preferably 12-25 wt %, based on total weight of the casein, of the casein stream originating from step (a) is subjected to step (b). Most preferably, about 16 wt %, based on total weight of the casein, of the casein stream originating from step (a) is subjected to step (b). Most preferably, the remainder is subjected to step (d). The amount of the casein stream originating from step (a) that is subjected to step (b) is advantageously governed by the desired whey protein to casein weight ratio in the recombined stream.

Preferably, all of the whey protein stream originating from step (a) is subjected to the combining of step (b). Likewise, in case acid whey originating from step (d) is used in the lactose source, it is preferred that all of the acid whey originating from step (d) is subjected to step (b). Making such use of the whey protein stream originating from step (a) and the acid whey originating from step (d) minimizes the amount of waste that is discarded by the process and optimally utilizes all components of the incoming milk.

The presence of lactose is typically required for both the infant formula product manufacture of step (c) as well as the dairy product manufacture of step (d), especially in case the diary product is a yogurt. Hence, in the process according to the invention, it is preferred that at least part of, preferably all of, the lactose stream originating from step (a) is subjected to step (b) and/or to step (d). In a preferred embodiment, the lactose stream originating from step (a) is divided over steps (b) and (d). Thus, in one embodiment, at least part of the lactose stream originating from step (a) is subjected to step (b). In this embodiment, step (b) involves combining at least part of the whey protein and the lactose streams originating from step (a) and at least part of the acid whey originating from step (d), and preferably part of the casein stream originating from step (a) into a recombined stream.

In one embodiment, 0-50 wt %, preferably 5-25 wt %, based on total weight of the lactose, of the lactose stream originating from step (a) is subjected to step (b) as (part of) the lactose source. Most preferably, the remainder is subjected to step (d). The amount of the lactose stream originating from step (a) that is subjected to step (b) as (part of) the lactose source is advantageously governed by the amount of lactose required for step (d). In case the amount of lactose in the lactose stream originating from step (a) that is subjected to step (b) would be insufficient for infant formula product manufacture, additional lactose can be used that is present in the acid whey originating from step (d). Hence, not all the lactose of the lactose stream may be needed in order to afford the desired lactose content in the recombined stream, such that remaining lactose may beneficially be used in step (d) as additive during the production of the acid dairy product, as such further reducing the amount of waste.

In one embodiment, part of the casein stream is combined with all of the whey protein stream, part of the lactose stream and all of the acid whey. In one embodiment, part of the casein stream is combined with all of the whey protein stream, all of the lactose stream and all of the acid whey. In one embodiment, part of the casein stream is combined with all of the whey protein stream, nothing of the lactose stream and all of the acid whey.

In one embodiment, part of the MFR originating from step (ii) is combined with at least part of the UFR originating from step (iii), at least part of the UFP originating from step (iii), and the acid whey originating from step (d).

In step (b), two or more streams are recombined into one stream. This recombining may occur at once (streams are combined simultaneously) or step-wise (streams are combined consecutively). In one embodiment, the acid whey originating from step (d) is combined prior to demineralisation with the lactose stream originating from step (iii), such that they can be both demineralized prior to being combined with the casein and whey protein streams. Combining can be performed as wet mixing or as dry mixing or even as a combination of both. Preferably, the combining occurs as wet mixing, wherein liquid compositions are mixed in the appropriate amounts.

Step (c)

In step (c), the recombined stream originating from step (b) is used to manufacture the infant formula product. Such manufacturing is known in the art and typically involves one or more of drying, concentrating, supplementing with vitamins, minerals, lipids and/or dietary fibres, heat treatment, homogenisation, packaging. In a preferred embodiment, step (c) does not involve heat treatment, and involves one or more of drying, concentrating, supplementing with vitamins, minerals, lipids and/or dietary fibres and packaging. Preferably, step (c) involves at least a drying step, most preferably it involves all of the above mentioned steps.

Although one or more of the separate streams may be dried prior to being combined in step (b), it is preferred that the recombined stream originating from step (b) is dried, preferably spray-dried. As such, only one drying step is needed in the manufacture of the infant formula product. Moreover, drying typically reduces the content of native protein, and performing multiple drying steps thus leads to a reduced content of native protein in the final infant formula product. In a preferred embodiment, the process according to the invention comprises only a single drying step, wherein in step (c) the recombined stream is dried, preferably by spray-drying. Due to the inherent limited heat-load exerted on the liquid nutritional composition by spray-drying, significant amounts of protein remain native during this step, such that the content of native protein in the final infant formula product is as high as possible.

In one embodiment, the recombined stream is concentrated, preferably prior to being dried. Such concentration may be accomplished by any means known in the art, such as by reverse osmosis (RO), nanofiltration (NF) and/or evaporation.

Heat treatment is known in the art and may e.g. by pasteurization, such as HTST, ESL or UHT, or sterilization, for example dry heat or moist heat sterilization. In a preferred embodiment, debacterialized, preferably pasteurized, defatted milk is used as incoming milk, such that no further heat treatment is required in the manufacture of step (c).

Depending on the desired type of infant formula product, supplementation of certain components, such as vitamins, minerals, lipids and/or dietary fibres, may be desired. Such supplementation can be performed either prior to, during or after combining step (b) and/or optionally prior to or after a drying step. The skilled person is aware of the requirements of particular types of infant formula products, e.g. from EU directive 91/321/EEC or EU directive 2006/141/EC or US Food and Drug Administration 21 CFR Ch 1 part 107, and is able to adjust the composition of the recombined stream in order to meet those requirements.

In one aspect, the present invention concerns the infant formula product obtainable by the process according to the invention, i.e. obtainable by step (c). The inventors have found that the digestibility of the protein fraction in the infant formula product according to the invention, i.e. as obtainable by the process according to the invention, is improved compared to protein fractions of known infant formula products. Herein, an improved digestibility refers to a digestibility closer to that of human milk. Digestibility typically refers to the rate of digestion, preferably the rate of protein digestion. Also, the whey protein obtainable by the method of the present invention constitutes an economically attractive protein source to be included in infant formulae.

In one aspect, the present invention concerns the whey protein as present in the whey protein stream obtainable by the process according to the invention, i.e. obtainable by step (a), which is comprised by an infant formula product obtainable by step (c). Said protein product exhibits improved digestibility, also in dried form. Said whey protein is preferably present with casein in a ratio of whey protein:casein in the range of 90:10 to 40:60, more preferably in the range of 80:20 to 50:50, even more preferably in the range of 75:25 to 50:50, most preferably in the range of 70:30 to 55:45. The whey protein obtainable by the present invention exhibits digestion kinetics closer to human milk than currently commercialized infant formula.

The skilled person is capable of determining the extent of digestibility, e.g. from Van de Braak et al. (*Clin. Nutr.* 2013, 32, 765-771). A preferred method for determining digestibility is according to the following Digestibility Test:

Digestibility Test

Gastric and intestinal conditions are simulated successively within consecutive bioreactors in a parallel bioreactor system. Within each reactor, the conditions are dynamic in the sense that the pH follows a pre-set curve and fresh artificial digestive juices are continuous added. The biochemical gastric and intestinal conditions, i.e. enzyme activity, bile concentrations and pH, are adjusted to mimic those of infants ingesting a dose of infant formula of 200 ml. Gastric digestion is mimicked by addition of pepsin/lipase solution (10 ml shot+0.5 ml/min), containing 37.5 mg Lipase (DF Amano 15) and 15 mg Pepsin (Sigma P7012) per 300 ml, while gradually decreasing pH to 4.3 by adding HCl over 2 hours. Intestinal digestion was mimicked at neutral pH (7.2) upon addition of sodium hydroxide/sodium carbonate and pancreatin/bile extract (45 ml shot+1 ml/min) containing 7.5 g pancreatin (4×USP, Pfizer) and 2.5 g bile extract (porcine powder Sigma B8631) per 500 ml, in 2 hours. At regular intervals, sampling is performed to follow protein digestion in time. Samples are subjected to chemical analysis, including: disappearance of substrate by SDS-page and SEC-HPLC, generation of primary amino groups by OPA, small peptide formation by SEC-HPLC, and formation of free amino acids by UPLC. Using this protocol, the rate of digestion of one component, such as a protein source or a food product containing the protein source, can readily be compared to the rate of digestion of another protein source or a food product containing the protein source.

In a further preferred embodiment, the present invention relates to an infant formula obtainable by step (c), containing the milk proteins obtainable by the method of the present invention, i.e. obtainable by step (a). Said milk proteins preferably include whey protein and casein, preferably present in a ratio in the range of 90:10 to 40:60, more preferably in the range of 80:20 to 50:50, even more preferably in the range of 75:25 to 50:50, most preferably in the range of 70:30 to 55:45. The whey and casein proteins obtainable by the present invention exhibit digestion kinetics closer to human milk than currently commercialized infant formula.

In one aspect, the invention concerns a method or use for improving digestibility of a protein fraction comprised in an infant formula product, comprising preparing the infant formula product with the process according to the present invention. In one aspect, the invention concerns a method or use for feeding a human infant, preferably a human infant of 0-6 months of age, comprising administrating the infant formula product according to the invention to said infant.

Step (d)

In step (d), part of the casein stream is further processed to obtain a dairy product, preferably an acidic dairy product. In a preferred embodiment, acid whey is obtained as by-product. The dairy product is manufactured from at least part of the casein stream originating from step (a) and defatted animal milk. Preferably, the defatted animal milk is the same animal milk as subjected to step (a), and preferably has undergone the same pretreatment steps, if any.

Acid whey, also referred to as sour whey, is a co-product of conventional process for the production of acidic dairy products, and is normally discarded as waste. Acid whey comprises valuable compounds such as lactose. In view of the rapidly increasing demand for acidic dairy products, in particular yogurts, the increasing acid whey waste stream is becoming a serious problem for the dairy industry, which is elegantly solved by the present invention. Preferably, all or part of the lactose stream originating from step (a) is used in the manufacturing of step (d).

Any means known in the art to manufacture dairy products can be used as step (d), such as a process for the manufacture of cheeses, yogurts or creams. Step (d) typically involves a process for the production of an acid dairy product, such as an acid cheese or yogurt, preferably of a stirred or strained yogurt product from casein as known in the art.

Step (d) typically comprises a combining step, wherein the casein stream originating from step (a) is combined with defatted animal milk, and possibly with one or more of a (further) whey protein source (e.g. whey protein concentrate (WPC), whey protein isolate (WPI)), cream, minerals and lactose. Herein, the defatted animal milk is preferably the same defatted animal milk that is subjected to step (a). Herein, the lactose may originate from step (a), from a demineralization step, preferably the demineralization step according to the present invention, or from an external source, most preferably the lactose at least partly originated from step (a). Minerals are preferably added, most preferably in the form of the lactose stream originating from step (a) that has not undergone demineralisation. This combining step is typically the first step of step (d). Most preferably, the casein stream originating from step (a) is combined with a whey protein source, preferably. Preferably, this combining is the first step in the manufacture of step (d). In other words, a mixture comprising at least part of the casein stream originating from step (a) and defatted animal milk, and optionally one or more of the further components listed above, is manufactured into a dairy product. The combining is preferably performed such that the weight ratio of protein from the casein stream to protein from the defatted animal milk is in the range of 0.1-9.0, most preferably in the range 0.5-2.0.

The presence of the animal milk ensures that whey protein and lactose are present during manufacture of the dairy product. A further lactose source, such as (part of) the lactose stream originating from step (a), may also be used in the manufacture of step (d), and is preferably combined with the casein stream originating from step (a) and the defatted animal milk during step (d).

Step (d) preferably comprises a centrifugation step wherein solids, that eventually form the dairy product, are separated from a liquid stream that is obtained as acid whey.

In a preferred embodiment, the acid whey used in the lactose source is obtained as a liquid stream from a centrifugation step during the manufacture of step (d). The combining of casein, whey protein and lactose to manufacture dairy products is known in the art and may be accomplished as deemed fit by the skilled person.

Typically, all of the casein stream originating from step (a) is used in either step (b) or in step (d), such that no further casein is remaining. In one embodiment, 50-90 wt %, preferably 75-88 wt %, based on total weight of the casein, of the casein stream originating from step (a) is subjected to step (d). Most preferably, about 84 wt %, based on total weight of the casein, of the casein stream originating from step (a) is subjected to step (d). Most preferably, the remainder is subjected to step (b).

Likewise, it is preferred that all of the lactose stream originating from step (a) is used in either step (b) or in step (d), such that no further lactose is remaining. In one embodiment, 50-100 wt %, preferably 75-95 wt %, based on total weight of the lactose, of the lactose stream originating from step (a) is subjected to step (d). Most preferably, the remainder is subjected to step (b).

In a preferred embodiment, defatted animal milk is the sole protein source for both products that are obtained by the process according to the invention. Preferably, all protein of the dairy product that is obtained in step (d) originates from the casein stream and optionally from the same animal skim milk that is subjected to step (a). As such, the animal skim milk is the sole source of protein for the dairy product.

Any other additive or component, known in the art to be suitable for the preparation of dairy products, may be added to the casein stream, the animal milk or the combination thereof. Suitable additives include milk fat, stabilizers, sweeteners, flavours, and the like. The use of milk that has been enriched with such additives to produce dairy products is known in the art.

In a preferred embodiment, the manufacture of the dairy product of step (d) affords acid whey as by-product, which is conventionally discarded as waste. Acid whey is known in the art and refers to a whey stream that is obtained in the production of acid dairy products such as yogurts and acid cheeses. Acid whey is typically a liquid composition, characterized by a pH of at most 5.5 or even at most 5.1. Acid whey typically contains, based on total dry weight 50-90 wt %, preferably 60-75 wt % lactose and 0-20 wt %, preferably 10-15 wt % whey protein. Acid whey further typically comprises minerals, including calcium, potassium, magnesium, sodium, chloride and phosphate. The total amount of ash in acid whey is typically in the range of 8-20 wt %, preferably 10-15 wt %, based on total dry weight.

The acid whey that originates from step (d) is preferably subjected to the combining of step (b) to be used as (part of) the lactose source in the production of the infant formula product. The ash content of acid whey can be undesirably high, and is thus preferably reduced by demineralization prior to being combined in step (b) with the whey protein stream and possibly part of the casein stream originating from step (a). In one embodiment, the acid whey originating from step (d) is combined with the lactose stream prior to demineralization of the combined lactose and acid whey streams. In case the lactose stream would not require demineralization, the acid whey may be subjected to demineralization without prior combination with the lactose stream. Such demineralization may be accomplished by any means known in the art.

FIGURE

The FIGURE depicts a preferred embodiment of the process according to the invention. Dotted arrows indicated preferred embodiments. MF=microfiltration; UF=ultra-filtration; Demin=demineralisation; D=dairy product; IF=infant formula product; L=lactose source. The different streams are represented by numbers 1-8: 1=defatted, preferably debacterialized, animal milk; 2=microfiltration retentate; 3=microfiltration permeate; 4=ultrafiltration retentate; 5=ultrafiltration permeate; 6=recombined stream; 7=acid whey; 8=demineralized lactose.

Figure 1:
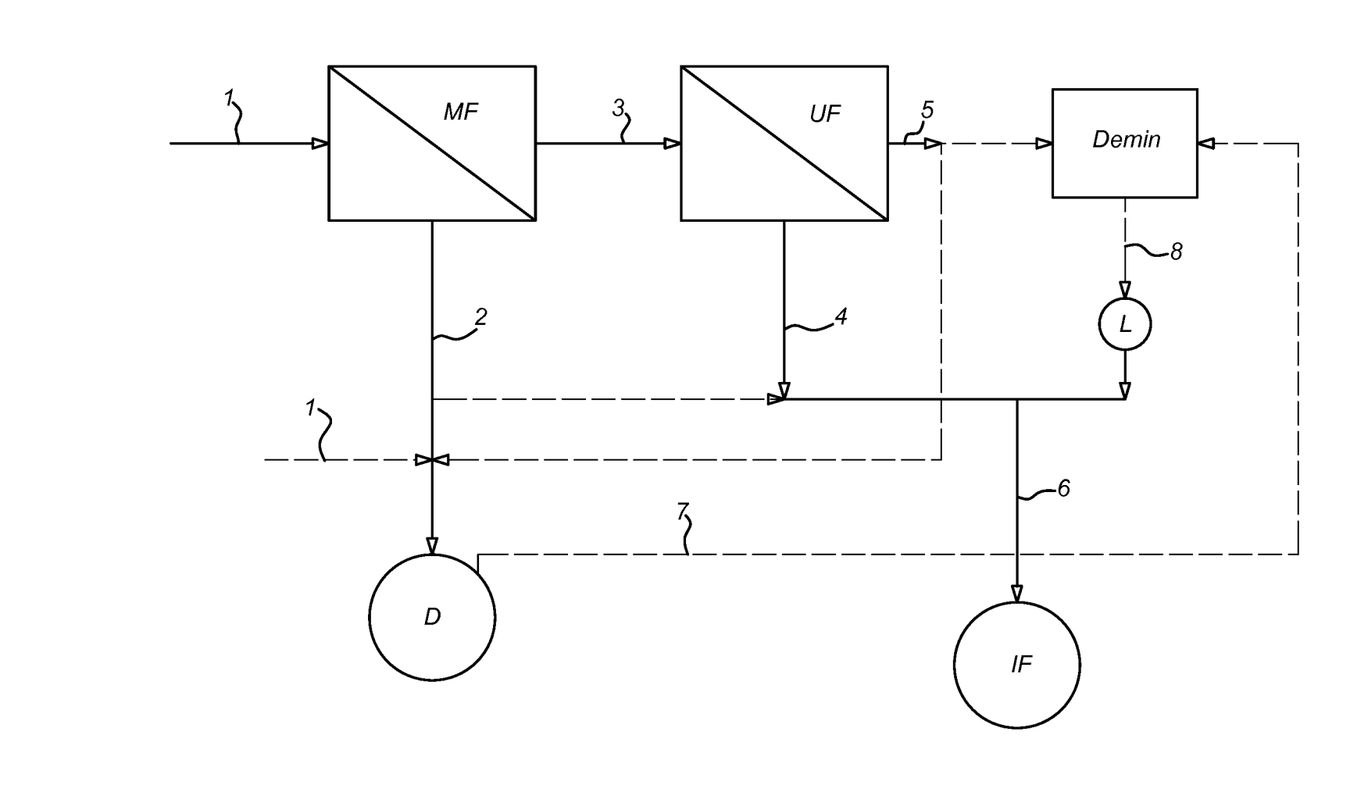

The invention claimed is:

1. A process for producing an infant formula product and a dairy product from defatted animal milk, comprising:
    (a) processing the defatted animal milk into a casein stream, a whey protein stream and a lactose stream by subjecting the defatted animal milk to microfiltration (MF) to obtain a casein stream as MF retentate and subjecting the MF permeate to ultrafiltration (UF) to obtain the whey protein stream as UF retentate and the lactose stream as UF permeate;
    (b) combining at least part of the whey protein stream originating from step (a) and a lactose source comprising acid whey, to obtain a recombined stream;
    (c) using the recombined stream originating from step (b) in the manufacture of the infant formula product; and
    (d) using at least part of the casein stream originating from step (a) and defatted animal milk in the manufacture of the dairy product.

2. The process according to claim 1, wherein the acid whey that is used in the combining of step (b) is obtained as by-product during the manufacture of step (d).

3. The process according to claim 2, wherein the acid whey is obtained as a liquid stream from a separation step during the manufacture of step (d).

4. The process according to claim 1, wherein the acid whey is subjected to demineralization prior to being used as lactose source in step (b).

5. The process according to claim 4, wherein the demineralization comprises at least one of salt precipitation, electrodialysis, lactose crystallization and ion exchange.

6. The process according to claim 4, wherein the acid whey and at least part of the lactose stream originating from step (a) are combined and subsequently subjected to the demineralization prior to being used as lactose source in step (b).

7. The process according to claim 1, wherein the defatted animal milk used in steps (a) and/or (d) is skim milk.

8. The process according to claim 1, wherein the process further comprises:
    (i) subjecting the defatted milk to bacterial removal to provide a debacterialized defatted milk which is subjected to step (a).

9. The process according to claim 1, wherein the processing of step (a) comprises:
    (ii) subjecting the defatted animal milk to microfiltration (MF) to obtain an MF-Retentate (MFR) and an MF-Permeate (MFP), and
    (iii) subjecting the MFP originating from step (ii) to ultrafiltration (UF) to obtain an UF-Retentate (UFR) and an UF-Permeate (UFP).

10. The process according to claim 1, wherein the ultrafiltration step operates at a volume concentration factor in the range of 20-200.

11. The process according to claim 1, wherein the manufacturing of step (c) includes at least one of drying, concentrating, supplementing with vitamins, minerals, lipids and/or dietary fibres, packaging.

12. The process according to claim 1, wherein defatted animal milk is the sole protein source for the infant formula product.

13. The process according to claim 5, wherein the demineralization is in combination with nanofiltration.

\* \* \* \* \*